United States Patent [19]
Kihara

[11] Patent Number: 5,788,432
[45] Date of Patent: Aug. 4, 1998

[54] METHOD AND APPARATUS FOR COMPUTING ALLOWABLE SPINDLE ROTATION SPEED

[75] Inventor: Hiroyuki Kihara, Chiba, Japan

[73] Assignee: Seiko Seiki Kabushiki Kaisha, Japan

[21] Appl. No.: 366,418

[22] Filed: Dec. 27, 1994

[30] Foreign Application Priority Data

Dec. 27, 1993 [JP] Japan .................... 5-333211

[51] Int. Cl.$^6$ .................... B23Q 15/12
[52] U.S. Cl. .................... 409/131; 409/232; 409/231; 73/579; 73/660; 364/474.12
[58] Field of Search ............... 73/579, 660; 364/474.12; 409/231, 232, 193, 186, 131; 408/9

[56] References Cited

U.S. PATENT DOCUMENTS

| | | | |
|---|---|---|---|
| 3,504,581 | 4/1970 | Weichbrodt et al. | 408/9 |
| 3,581,830 | 6/1971 | Stoner | 173/6 |
| 4,078,434 | 3/1978 | Weberhofer | 73/579 |
| 4,302,813 | 11/1981 | Kurihara et al. | 73/579 |
| 4,614,117 | 9/1986 | Taniguti | 73/660 |
| 4,758,964 | 7/1988 | Bittner et al. | 73/660 |
| 5,109,700 | 5/1992 | Hicho | 73/660 |
| 5,144,840 | 9/1992 | Whipple, III | 73/660 |
| 5,163,334 | 11/1992 | Li et al. | 73/865.9 |
| 5,365,787 | 11/1994 | Hernandez et al. | 73/660 |

FOREIGN PATENT DOCUMENTS

| | | | |
|---|---|---|---|
| 60-127907 | 7/1985 | Japan | 408/9 |
| 1421101 | 1/1976 | United Kingdom | 73/660 |

OTHER PUBLICATIONS

Patent Abstract of Japan, vol. 16, No. 192 (E–1199) 11 May 1992.

Patent Abstract of Japan, vol. 14, No. 71 (M–0933) 9 Feb. 1990.

*Primary Examiner*—M. Rachuba
*Assistant Examiner*—Christopher Kirkman
*Attorney, Agent, or Firm*—Adams & Wilks

[57] ABSTRACT

A spindle apparatus comprises a main shaft mounted for rotary movement, a rotating device for rotating the main shaft about an axis, a vibration device for vibrating the main shaft, a detecting device for detecting a displacement of the main shaft when the main shaft is vibrated by the vibration device and providing an output signal indicative of the displacement of the main shaft, a calculating device for calculating an allowable revolution speed of the main shaft on the basis of the output signal of the detecting device, and a drive source for driving the rotating device to rotate the main shaft within a speed range which does not exceed the allowable revolution speed. When an end of the main shaft is vibrated by the vibration device, a displacement of the vibrated main shaft is detected by the detecting device which provides an output signal indicative of the detected displacement. The calculating device calculates an allowable revolution speed of the main shaft on the basis of the output signal of the detecting device and outputs the calculated allowable revolution speed to the drive source. The drive source drives the rotating device to rotate the main shaft within a speed range which does not exceed the allowable revolution speed.

13 Claims, 2 Drawing Sheets

METHOD AND APPARATUS FOR COMPUTING ALLOWABLE SPINDLE ROTATION SPEED

BACKGROUND OF THE INVENTION

The present invention relates to a spindle apparatus on which tools or the like for an internal surface cutting machine or a milling machine are detachably mounted.

Conventionally, such a spindle apparatus has been provided with a main shaft which is rotated about an axis by a motor and is rotatably supported by bearings or the like, with a tool such as a grind stone or an end mill detachably mounted at its end.

In the case where the tool is thus mounted at a tip end of the main shaft, a resonant frequency would be reduced in comparison with the main shaft without the tool. Accordingly, an allowable revolution speed of the main shaft is restricted by the resonant frequency which is obtained under the condition that the tool is mounted on the main shaft.

In general, the resonant frequency of the main shaft on which the tool is mounted is separately measured by a conventional acceleration pickup or a combination of a displacement potentiometer and an FFT (fast Fourier transformation) device. The allowable revolution speed of the spindle is obtained by multiplying the measurement result by a safety factor (for example, 0.7). When the allowable revolution speed of the spindle is thus determined, the allowable revolution speed is outputted to a drive means for driving the motor to rotate the main shaft. When the revolution speed is outputted to the drive means (i.e., a high frequency power source device), a volume knob or the like for setting the revolution speed is operated so that the revolution speed to be set would not exceed the allowable revolution speed, while supervising an analog meter which displays the revolution speed, or otherwise, the revolution speed is inputted while using an operational panel for digital setting operation.

Thus, in the conventional spindle apparatus, in order to determine the allowable revolution speed for the main shaft, it is necessary to measure the resonant frequency of the spindle which is kept under the condition that the tool is mounted thereon, by using the acceleration pickup or the combination of the displacement potentiometer and the FFT device. Accordingly, whenever the tools are interchanged, it is necessary to prepare the acceleration pickup or the like and to measure the resonant frequency of the spindle under the condition that a new tool is mounted on the main shaft. This is troublesome. Namely, the conventional system suffers from a defect that it takes a long period of time until the spindle is rotated below the allowable revolution speed.

Furthermore, in the conventional spindle apparatus, when the allowable revolution speed is outputted to the drive means, the volume knob or the like for setting the revolution speed is operated while supervising the analog meter which displays the revolution speed. Accordingly, it is unavoidable to cause an error in readout of the analog meter and a malfunction of the volume knob or the like. It is thus impossible to set exactly the allowable revolution speed. In addition, it is necessary to set the revolution speed on the operational panel for the digital setting operation.

Moreover, in the conventional spindle apparatus, in order to prevent the main shaft from rotating above the revolution speed, which has been outputted to the drive means, (i.e., allowable revolution speed), an independent interlock device which operates at the above-described set revolution speed is required. Whenever the revolution speed which has been outputted to the drive means is to be changed, it is necessary to adjust the interlock device so that it may operate at the changed revolution speed. This is troublesome. Furthermore, in setting the digital parameters on the operational panel, it is necessary to confirm the input values.

SUMMARY OF THE INVENTION

It is an object of the present invention to provide a convenient spindle apparatus in which an allowable revolution speed of the main shaft may be quickly and exactly set and it is possible to quickly rotate a main shaft so as not to exceed the allowable revolution speed.

In order to attain this object, according to the present invention, there is provided a spindle apparatus comprising: a main shaft on which a tool is detachably mounted, said main shaft being rotatably supported in place; a motor for rotating said main shaft about an axis; a sensor section for detecting a displacement of said main shaft vibration means for vibrating the main shaft; allowable revolution speed computation means for calculating and outputting an allowable revolution speed of said main shaft on the basis of a vibration attenuation displacement of said main shaft detected by said sensor section when said main shaft is vibrated; by the vibration means and drive means for receiving a signal indicative of the allowable revolution speed outputted by said allowable revolution speed computation means and driving said motor to rotate the main shaft so as not to exceed said allowable revolution speed.

According to this invention, when the main shaft is vibrated by the vibration means, the allowable revolution speed computation means calculates the allowable revolution speed of the main shaft on the basis of the vibration attenuation displacement of the main shaft detected by the sensor section upon the vibration. Thereafter, the drive means drives the motor in the range below the calculation result (i.e., allowable revolution speed) to thereby rotate the main shaft.

DETAILED DESCRIPTION OF THE PREFERRED EMBODIMENT

A spindle apparatus according to an embodiment of the invention will now be described with reference to FIGS. 1 and 2.

Figure 1:
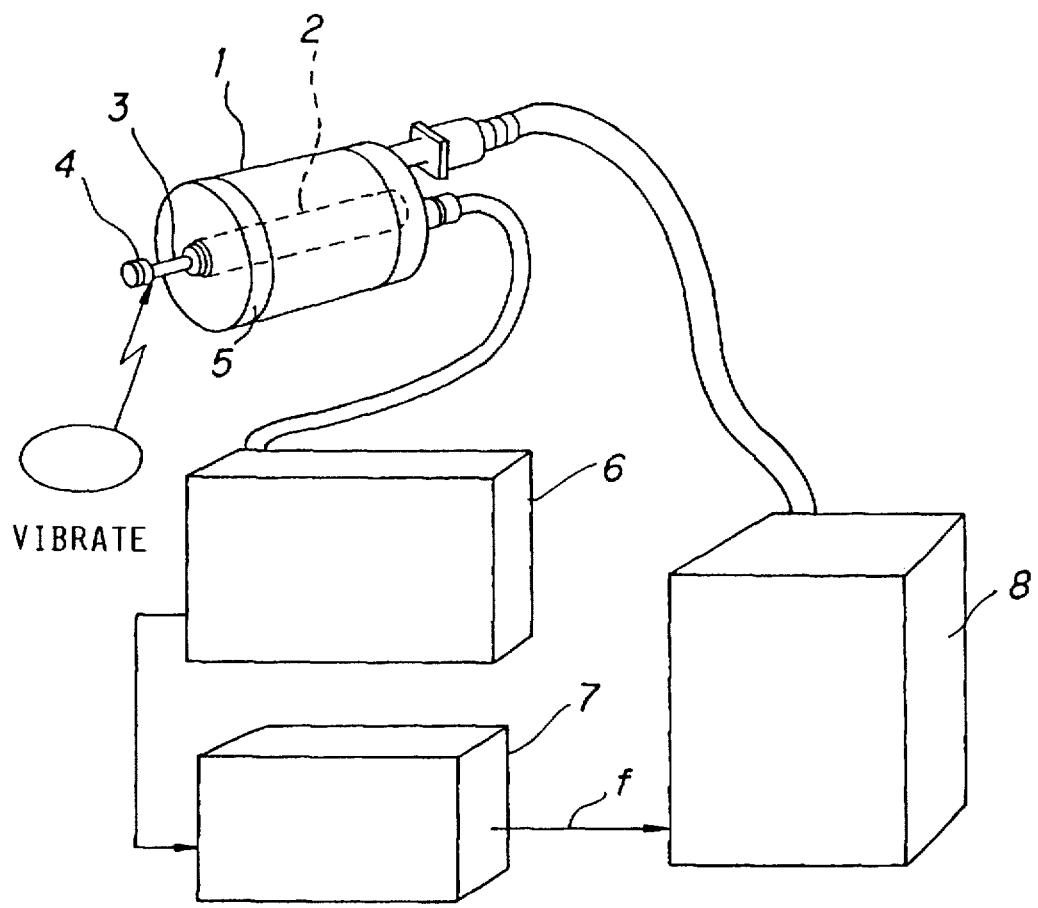
FIG. 1 is an illustration of a spindle apparatus according to the present invention.
Figure 2:
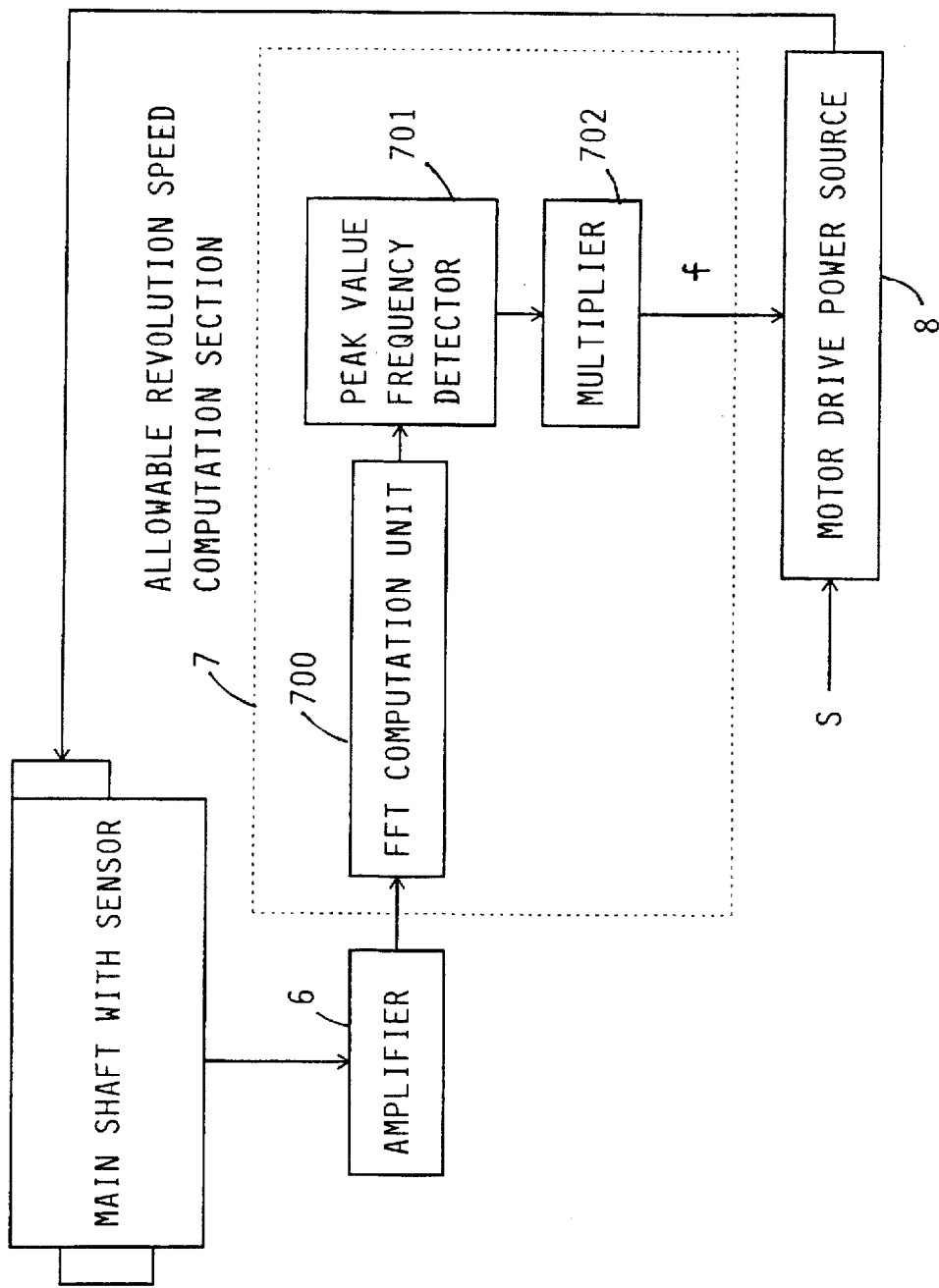
FIG. 2 is a block diagram showing the spindle apparatus shown in FIG. 1.

As shown in FIG. 1, the spindle apparatus is provided with a main shaft 2 disposed within a case body 1. The main shaft 2 is rotatably supported by bearings or the like. A tool 4 such as a grind stone or an end mill is detachably mounted through a quill 3 to a tip end of the main shaft 2.

A conventional motor (not shown) such as a high frequency motor is disposed within the case body 1. The motor is used to rotate the main shaft 2 about an axis.

For instance, an eddy current type sensor 5 is provided at and around an end of the main shaft 2 for detecting a radial displacement of the main shaft 2. A detection result (i.e., the radial displacement of the main shaft 2) is amplified by an amplifier 6 and then fed to an allowable revolution speed computation section 7.

The allowable revolution speed computation section 7 calculates the allowable revolution speed of the main shaft 2 on the basis of the radial displacement of the main shaft 2 when the end of the main shaft 2 or the part of the tool 4 is vibrated by a hammer or the like. The computation section 7 is composed of an FFT (fast Fourier transformation) computation unit 700, a peak value frequency detector 701 and a multiplier 702, as shown in FIG. 2.

The FFT computation unit 700 calculates a power spectrum relative to the output from the amplifier 6, the output being the detection result by the sensor 5(i.e., the radial vibration attenuation displacement of the main shaft 2).

The peak value frequency detector 701 detects the frequency at a peak value from the computation result in the FFT computation unit 700 and uses the detection result as a resonant frequency of the main shaft 2 under the condition that the tool 4 is mounted on the main shaft.

The multiplier 702 multiplies, by a safety factor (e.g., 0.7), the detection result of the peak value frequency detector 701, i.e., the resonant frequency of the main shaft 2 under the condition that the tool is mounted on the main shaft 2. At the same time, the multiplier 702 outputs the multiplication result as an allowable revolution speed f of the main shaft 2 provided with the tool 4 to a motor drive power source 8 for driving the motor (not shown).

The motor drive power source 8 is composed of a high frequency power source device (invertor) or the like. The final calculation result (i.e., the allowable revolution speed f) in the computation section 7 is outputted to a set value storage section (not shown). The motor drive power source 8 waits for a main shaft rotation start signal s from an outside source at the time when the allowable revolution speed f has been set. When the signal representative of this condition is issued, the motor (not shown) is driven to rotate the main shaft 2 within a range such that the revolution speed thereof does not exceed the allowable revolution speed f.

Thus, the motor drive power source 8 has a so-called interlock function such that the main shaft 2 is rotated within the range that the revolution speed thereof does not exceed the allowable revolution speed f.

The operation of the thus constructed spindle apparatus will now be described with reference to FIGS. 1 and 2.

In the spindle apparatus, when the end of the main shaft 2 or the part of the tool 4 is vibrated by a vibration means such as a hammer or the like or an automatic vibration device to thereby vibrate the main shaft 2, the radial vibration attenuation displacement of the main shaft 2 is fed from the sensor section 5 to the allowable revolution speed computation section 7 through the amplifier 6.

When the radial vibration attenuation displacement of the main shaft is fed to the allowable revolution speed computation section 7 as described above, the FFT computation unit 700 executes the calculation of the power spectrum relative to the detection result (i.e., radial vibration attenuation displacement of the main shaft 2) in the sensor section 5. Thereafter, the peak value frequency detector 701 detects the peak value frequency from the calculation result of the FFT computation unit 700, and uses the detection result as the resonant frequency of the main shaft 2 provided with the tool 4. Subsequently, the multiplier 702 multiplies, by the safety factor, the detection result (i.e., the resonant frequency of the tool provided main shaft 2) in the peak value frequency detector 701 and outputs the multiplication result to the motor drive power source 8 as the allowable revolution speed f of the main shaft 2 provided with the tool 4.

Also, when the allowable revolution speed f of the main shaft 2 provided with the tool 4 is thus outputted to the motor drive power source 8, the allowable revolution speed f is outputted to the set value storage section (not shown) of the motor drive power source 8. Thereafter, when the rotation start command is given to the motor drive power source 8, the motor drive power source 8 drives the motor (not shown) within the range such that the revolution speed thereof does not exceed the allowable revolution speed f, thereby rotating the main shaft 2.

Namely, the preparatory steps for seeking the allowable revolution speed f of the main shaft 2 provided with the tool 4 and for rotating the main shaft 2 in the range that the revolution speed thereof does not exceed the allowable revolution speed are all automatically completed by vibrating the end of the main shaft 2 or the part of the tool 4 with vibrating means such as a hammer or an automatic vibration device.

In other words, in the spindle apparatus according to this embodiment, the allowable revolution speed of the main shaft provided with the tool 4 is sought and the preparation for rotating the main shaft within the range below the allowable revolution speed is all automatically carried out only by slightly vibrating the end or the like of the main shaft with vibrating means such as a hammer or an automatic vibration device. Accordingly, it is possible to dispense with the work required for preparing the acceleration pickup or the displacement potentiometer, setting the latter and measuring the allowable revolution speed of the main shaft, whenever the tools are interchanged, and for operating the revolution speed setting volume knob or the like while supervising the analog meter representing the allowable revolution speed when the allowable revolution speed is outputted to the drive means as in the conventional system. At the same time, it is possible to avoid the error in readout of the analog meter and the malfunction of the volume knob. Also, it is possible to dispense with the set value input operation on the operational panel for digital value setting and the confirmation requirement therefor. It is possible to rapidly and exactly rotate the main shaft within the range such that the revolution speed of the main shaft does not exceed the allowable revolution speed. This is very convenient.

In the spindle apparatus according to the present invention, as described above, there are provided the motor for rotating the main shaft, the sensor section for detecting the displacement of the main shaft, vibration means for vibrating the main shaft, the allowable revolution speed computation means for driving the motor and the drive means. The allowable revolution speed computation means calculates the allowable revolution speed on the basis of the vibration attenuation displacement of the main shaft detected by the sensor section when the main shaft is vibrated, and the drive means drives the motor within the range such that the revolution speed of the main shaft does not exceed the computation result (allowable revolution speed) calculated by the allowable revolution speed computation means to thereby rotate the main shaft. Accordingly, by only vibrating the main shaft, it is possible to obtain the allowable revolution speed of the main shaft provided with the tool and to automatically complete all the preparation for rotating the main shaft within the range that the revolution speed of the main shaft does not exceed the allowable revolution speed. It is therefore possible to rapidly and exactly rotate the main shaft within the range that the revolution speed thereof does not exceed the allowable revolution speed. By this construction, it is possible to enhance the operability of the spindle apparatus.

What is claimed is:

1. A spindle apparatus comprising:

a main shaft mounted for rotary movement;

a tool detachably mounted on the main shaft;

a motor for rotating the main shaft about an axis;

vibration means for vibrating the main shaft;

sensor means for detecting a displacement of the main shaft when the main shaft is vibrated by the vibration means and providing an output signal indicative of the displacement of the main shaft;

allowable revolution speed computation means for calculating an allowable revolution speed of the main shaft on the basis of the output signal of the sensor means; and drive means receptive of a signal indicative of the allowable revolution speed of the main shaft calculated by the allowable revolution speed computation means for driving the motor to rotate the main shaft within a speed range which does not exceed the calculated allowable revolution speed.

2. A spindle apparatus as claimed in claim 1; wherein the allowable revolution speed computation means comprises converter means for converting the output signal of the sensor means to a power spectrum, a peak value frequency detector for detecting a peak value frequency of the power spectrum, and a multiplier for multiplying the detected peak value frequency by a predetermined factor to obtain the allowable revolution speed of the main shaft and outputting the allowable revolution speed to the drive means.

3. A spindle apparatus as claimed in claim 2; wherein the converter means converts the output signal to a power spectrum by fast Fourier transformation.

4. A spindle apparatus as claimed in claim 3; further comprising amplifying means for amplifying the output signal of the sensor means and outputting the amplified output signal to the converter means.

5. A spindle apparatus as claimed in claim 1; further comprising a tool mounted at one end of the main shaft for rotary movement therewith, the tool being vibrated together with the main shaft by the vibration means.

6. A spindle apparatus comprising: a main shaft mounted for rotary movement; rotating means for rotating the main shaft about an axis; vibration means for vibrating the main shaft; detecting means for detecting a displacement of the main shaft when the main shaft is vibrated by the vibration means and providing an output signal indicative of the displacement; calculating means for calculating an allowable revolution speed of the main shaft on the basis of the output signal of the detecting means; and drive means for driving the rotating means to rotate the main shaft within a speed range which does not exceed the allowable revolution speed.

7. A spindle apparatus as claimed in claim 6; wherein the computation means comprises converter means for converting the output signal of the detecting means to a power spectrum, a peak value frequency detector for detecting a peak value frequency of the power spectrum, and a multiplier for multiplying the detected peak value frequency by a predetermined factor to obtain the allowable revolution speed of the main shaft and outputting the allowable revolution speed to the drive means.

8. A spindle apparatus as claimed in claim 7; wherein the converter means converts the output signal to a power spectrum by fast Fourier transformation.

9. A spindle apparatus as claimed in claim 8; further comprising amplifying means for amplifying the output signal of the detecting means and outputting the amplified output signal to the converter means.

10. A method for controllably rotating a main shaft within a speed range which does not exceed an allowable revolution speed, comprising the steps of: providing a rotatable main shaft; vibrating the main shaft; detecting a displacement of the main shaft resulting from the vibration thereof and providing an output signal indicative of the displacement; calculating an allowable revolution speed of the main shaft on the basis of the output signal; and rotating the main shaft within a speed range which does not exceed the calculated allowable revolution speed.

11. A method as claimed in claim 10; wherein the calculating step comprises converting the output signal indicative of the displacement of the main shaft to a power spectrum, detecting a peak value frequency of the power spectrum, and multiplying the detected peak value frequency by a predetermined factor to obtain the allowable revolution speed of the main shaft.

12. A method as claimed in claim 11; wherein the output signal is converted to a power spectrum by fast Fourier transformation.

13. A method as claimed in claim 10; including amplifying the signal indicative of the displacement of the main shaft prior to calculating the allowable revolution speed of the main shaft.

* * * * *